United States Patent
Nehls

(10) Patent No.: US 12,351,120 B2
(45) Date of Patent: Jul. 8, 2025

(54) METHOD AND CONTROLLER FOR PROTECTION FROM UNAUTHORIZED INSTALLATION OF A PYROTECHNIC COMPONENT

(71) Applicant: Bayerische Motoren Werke Aktiengesellschaft, Munich (DE)

(72) Inventor: Wolfgang Nehls, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 189 days.

(21) Appl. No.: 18/021,468

(22) PCT Filed: Jul. 30, 2021

(86) PCT No.: PCT/EP2021/071455
§ 371 (c)(1),
(2) Date: Feb. 15, 2023

(87) PCT Pub. No.: WO2022/058080
PCT Pub. Date: Mar. 24, 2022

(65) Prior Publication Data
US 2023/0331181 A1    Oct. 19, 2023

(30) Foreign Application Priority Data
Sep. 15, 2020   (DE) ............... 10 2020 124 056.2

(51) Int. Cl.
*B60R 21/01*    (2006.01)
*B60R 21/017*   (2006.01)

(52) U.S. Cl.
CPC .......... *B60R 21/0173* (2013.01); *B60R 21/01* (2013.01)

(58) Field of Classification Search
CPC ............... B60R 21/0173; B60R 21/01; B60R 2021/0119; B60R 2021/01122
See application file for complete search history.

(56) References Cited

U.S. PATENT DOCUMENTS 4,549,770 A * 10/1985 Kurtti ................. B60R 22/1855
297/483
4,968,965 A * 11/1990 Naitou ................ B60R 21/0173
340/436

(Continued)

FOREIGN PATENT DOCUMENTS

CN    107361832 A  * 11/2017 ............. A61B 17/42
CN    206997105 U  *  2/2018

(Continued)

OTHER PUBLICATIONS

"Security Evaluation of an Airbag-ECU by Reusing Threat Modeling Artefacts;" Durrwang et al., 2017 International Conference on Computational Science and Computational Intelligence (CSCI) (2017, pp. 37-43); Dec. 1, 2017. (Year: 2017).*

(Continued)

*Primary Examiner* — Khoi H Tran
*Assistant Examiner* — Jorge O Peche
(74) *Attorney, Agent, or Firm* — Crowell & Moring LLP

(57) ABSTRACT

A controller for triggering a pyrotechnic component of a vehicle is designed to determine and store a trigger status of the pyrotechnic component. The trigger status exhibits a triggered state or a non-triggered state. The controller is further designed, if the trigger status exhibits the non-triggered state, to allow operation of the controller with a pyrotechnic component in the vehicle without enabling the pyrotechnic component. Further, the controller is designed, if the trigger status exhibits the triggered state, to reset the (Continued)

trigger status from the triggered state to the non-triggered state when the pyrotechnic component is enabled.

13 Claims, 1 Drawing Sheet

(56) References Cited

U.S. PATENT DOCUMENTS

| | | | | |
|---|---|---|---|---|
| 4,984,651 | A * | 1/1991 | Grosch | B60R 21/01 180/268 |
| 5,232,243 | A * | 8/1993 | Blackburn | B60R 21/276 177/144 |
| 5,327,014 | A * | 7/1994 | Huber | B60R 21/0173 180/282 |
| 5,432,385 | A * | 7/1995 | Kincaid | B60R 21/0173 340/436 |
| 5,433,101 | A * | 7/1995 | Spangler | B60R 21/0132 340/436 |
| 5,544,716 | A * | 8/1996 | White | B60R 21/0136 180/274 |
| 5,602,736 | A * | 2/1997 | Toya | B60R 21/0132 280/735 |
| 5,677,838 | A * | 10/1997 | Itou | G06F 11/0757 701/29.2 |
| 5,787,377 | A * | 7/1998 | Watanabe | B60R 21/01526 280/735 |
| 5,794,971 | A * | 8/1998 | Boydston | B60R 21/18 280/743.1 |
| 5,847,472 | A * | 12/1998 | Byon | B60R 21/0173 340/436 |
| 5,851,025 | A * | 12/1998 | Gamboa | B60R 21/01546 280/735 |
| 5,957,988 | A * | 9/1999 | Osajda | F42D 1/045 701/45 |
| 6,020,655 | A * | 2/2000 | Heiner | B60R 21/0173 307/10.1 |
| 6,070,113 | A * | 5/2000 | White | B60R 21/013 180/282 |
| 6,654,671 | B2 * | 11/2003 | Schubert | B60R 21/0133 701/1 |
| 6,856,868 | B1 * | 2/2005 | Le | B60W 40/11 701/72 |
| 7,069,860 | B2 * | 7/2006 | Okamoto | B60R 21/2644 102/206 |
| 7,522,982 | B2 * | 4/2009 | Le | B60R 21/0132 701/45 |
| 7,702,440 | B2 * | 4/2010 | Wu | G01M 1/122 701/45 |
| 8,244,437 | B2 * | 8/2012 | Le | B60R 21/0136 340/436 |
| 9,934,625 | B1 * | 4/2018 | Wahba | G07C 5/008 |
| 10,082,422 | B2 * | 9/2018 | Muramatsu | G01G 19/4142 |
| 10,805,068 | B1 * | 10/2020 | Leise | G07C 5/0816 |
| 11,577,677 | B2 * | 2/2023 | Rojas | B60R 21/20 |
| 2002/0130507 | A1 * | 9/2002 | Kim | B60R 21/18 280/801.1 |
| 2003/0001378 | A1 * | 1/2003 | Kim | B60R 21/231 280/801.1 |
| 2003/0089156 | A1 * | 5/2003 | Schweizer | B60R 21/01 702/115 |
| 2003/0168839 | A1 * | 9/2003 | Miyoshi | B60R 21/0173 280/735 |
| 2004/0088094 | A1 * | 5/2004 | Kleinschmidt | B60R 21/0136 340/436 |
| 2004/0206904 | A1 * | 10/2004 | Djordjevic | B60N 2/0024 250/330 |
| 2004/0233045 | A1 * | 11/2004 | Mays | G08G 1/096716 340/901 |
| 2005/0017487 | A1 * | 1/2005 | Andres | B60R 21/0132 280/735 |
| 2006/0012679 | A1 * | 1/2006 | Ressler | G08B 13/1961 348/148 |
| 2006/0082110 | A1 * | 4/2006 | Gaboury | B60R 21/0134 280/735 |
| 2006/0273559 | A1 * | 12/2006 | Uono | B60R 21/01332 180/274 |
| 2007/0055429 | A1 * | 3/2007 | Komaki | B60R 21/013 701/45 |
| 2008/0257252 | A1 * | 10/2008 | Kobetz | B60R 21/16 116/28 R |
| 2009/0099735 | A1 * | 4/2009 | McCoy | B60R 21/0134 701/46 |
| 2009/0160459 | A1 * | 6/2009 | De Langen | B60R 21/0173 324/685 |
| 2009/0195991 | A1 * | 8/2009 | Suzaki | H05K 7/142 361/720 |
| 2009/0303365 | A1 * | 12/2009 | Watanabe | H04N 25/53 348/302 |
| 2010/0177538 | A1 * | 7/2010 | Scherr | G01R 31/28 363/39 |
| 2010/0198446 | A1 * | 8/2010 | Erb | B60R 21/0132 280/735 |
| 2011/0202241 | A1 * | 8/2011 | Le | B60R 21/0134 701/46 |
| 2012/0038131 | A1 * | 2/2012 | Muller | B60R 21/201 29/428 |
| 2013/0038045 | A1 * | 2/2013 | Kwon | B60R 21/01 280/735 |
| 2013/0234670 | A1 * | 9/2013 | Bertsch | H01M 10/48 320/127 |
| 2014/0099015 | A1 * | 4/2014 | Adams | B60R 21/215 382/141 |
| 2014/0099016 | A1 * | 4/2014 | Adams | B60R 21/232 382/141 |
| 2014/0375327 | A1 * | 12/2014 | Sievers | G01R 19/0084 324/503 |
| 2015/0120084 | A1 * | 4/2015 | List | B60R 21/017 701/1 |
| 2015/0242803 | A1 * | 8/2015 | Morby | G06Q 10/087 705/28 |
| 2015/0312764 | A1 * | 10/2015 | Tuukkanen | G08B 29/188 455/411 |
| 2016/0052481 | A1 * | 2/2016 | Yamauchi | B60R 21/2644 102/530 |
| 2016/0129879 | A1 * | 5/2016 | Harda | B60R 22/46 297/216.13 |
| 2016/0129881 | A1 * | 5/2016 | Harda | B60R 22/48 701/45 |
| 2016/0236637 | A1 * | 8/2016 | Krishna | B60R 21/0173 |
| 2017/0267192 | A1 * | 9/2017 | Chen | G07C 5/085 |
| 2017/0267197 | A1 * | 9/2017 | Kriger | B60R 21/01546 |
| 2017/0361465 | A1 * | 12/2017 | Zevenbergen | B25J 9/1676 |
| 2018/0244229 | A1 * | 8/2018 | Settles | B64D 45/00 |
| 2019/0036946 | A1 * | 1/2019 | Ruvio | H04W 12/10 |
| 2019/0295332 | A1 * | 9/2019 | Hwang | B60R 21/01 |
| 2019/0389413 | A1 * | 12/2019 | Vo | G06K 19/06037 |
| 2020/0079319 | A1 * | 3/2020 | Zeryihun | B60R 21/01 |
| 2020/0125906 | A1 * | 4/2020 | Hill | B60R 21/232 |
| 2020/0361410 | A1 * | 11/2020 | Jayakar | B60R 21/214 |
| 2021/0012972 | A1 * | 1/2021 | Murray, Jr. | H01R 12/58 |
| 2021/0136572 | A1 * | 5/2021 | Ingraham | H04W 12/069 |
| 2022/0153217 | A1 * | 5/2022 | Buika | B60R 21/01 |
| 2023/0017962 | A1 * | 1/2023 | Huang | H04W 4/48 |
| 2023/0019817 | A1 * | 1/2023 | Huang | H04L 67/12 |
| 2023/0071017 | A1 * | 3/2023 | Feist | A41D 13/0556 |
| 2023/0331181 | A1 * | 10/2023 | Nehls | B60R 21/01 |

FOREIGN PATENT DOCUMENTS

| | | | | |
|---|---|---|---|---|
| CN | 115480502 A | * | 12/2022 | B60L 58/13 |
| DE | 195 16 019 C1 | | 9/1996 | |
| DE | 10108879 A1 | * | 9/2002 | B60R 21/013 |
| DE | 102 60 475 A1 | | 7/2004 | |
| DE | 19757393 B4 | * | 12/2006 | B60R 21/0132 |
| DE | 10 2007 023 322 A1 | | 11/2008 | |
| DE | 10 2007 035 351 A1 | | 1/2009 | |
| DE | 102013000116 A1 | * | 7/2014 | B60R 21/0173 |
| DE | 202014003287 U1 | * | 6/2015 | B60K 28/14 |
| DE | 10 2019 123 921 A1 | | 3/2020 | |

(56) References Cited

FOREIGN PATENT DOCUMENTS

| DE | 102019201835 A1 | * | 8/2020 | |
|---|---|---|---|---|
| DE | 102020120431 B3 | * | 10/2021 | |
| DE | 102020124056 A1 | * | 3/2022 | ............. B60R 21/01 |
| EP | 982200 A1 | * | 3/2000 | ......... B60R 21/0173 |
| EP | 2 106 942 A1 | | 10/2009 | |
| GB | 2347542 A | * | 9/2000 | ........... B60R 21/013 |
| JP | 2759048 B2 | * | 5/1998 | |
| JP | H11509929 A | * | 8/1999 | |
| WO | WO-9502828 A1 | * | 1/1995 | ......... B60R 21/0132 |
| WO | WO-9640538 A1 | * | 12/1996 | ............. B60R 21/16 |
| WO | WO-2020078767 A1 | * | 4/2020 | ............. B60R 21/01 |

OTHER PUBLICATIONS

"Testing reverse polarity energy reserve capacitor with the automatic crash event generator;" Gavrila et al., 2012 10th International Symposium on Electronics and Telecommunications (2012, pp. 15-18); Nov. 1, 2012. (Year: 2012).*

"A treatise on crash sensing for automotive air bag systems;" Chan; IEEE/ASME Transactions on Mechatronics (vol. 7, Issue: 2, 2002, pp. 220-234); Jun. 1, 2002. (Year: 2002).*

International Search Report (PCT/ISA/210) issued in PCT Application No. PCT/EP2021/071455 dated Dec. 3, 2021 with English translation (five (5) pages).

German-language Written Opinion (PCT/ISA/237) issued in PCT Application No. PCT/EP2021/071455 dated Dec. 3, 2021 (six (6) pages).

German-language Search Report issued in German Application No. 10 2020 124 056.2 dated Mar. 1, 2021 with partial English translation (11 pages).

* cited by examiner

METHOD AND CONTROLLER FOR PROTECTION FROM UNAUTHORIZED INSTALLATION OF A PYROTECHNIC COMPONENT

BACKGROUND AND SUMMARY

The invention relates to a vehicle having one or more pyrotechnic components such as, for example, a driver airbag module or a belt tensioner. In particular, the invention relates to a method and a corresponding controller, by means of which any unauthorized installation of a pyrotechnic component can be prevented in an efficient and reliable manner.

A vehicle can comprise one or more pyrotechnic components such as, for example, an airbag module or a belt tensioner. An airbag module can be, for example, an element of the steering wheel of the vehicle, in which an airbag is integrated. In the event of the triggering of the airbag, driving means in the airbag module are electrically triggered, and the gas-filled bag deploys its protective action.

Once triggered, it is necessary for the airbag module to be completely replaced, as the selective repair of the module is typically not possible. As costs for an airbag module can be relatively high, a form of acquisitive crime has developed, wherein airbag modules are removed and/or stolen from other vehicles. These airbag modules are then illicitly installed in vehicles having previously triggered airbag modules, which it is necessary to replace.

The theft of airbag modules is a source of prejudice for both vehicle users and insurers. The present document addresses the technical object of the efficient and reliable prevention of the illicit installation of a pyrotechnic component, particularly an airbag module, in a vehicle, particularly in the interests of preventing the associated acquisitive crime.

This object is fulfilled by each of the independent claims. Advantageous embodiments are described, among others, in the dependent claims. It is hereby observed that additional features of a patent claim which is dependent upon an independent patent claim, in the absence of the features of the independent patent claim, or in combination with only a proportion of the features of the independent patent claim, can form a standalone invention which is independent of the combination of all the features of the independent patent claim, and which can be the subject matter of an independent claim, a divisional application or a subsequent application. The same applies, in a corresponding manner, to the technical instruction described in the description, which can form an invention which is independent of the features of the independent patent claims.

According to one aspect, a controller is described for triggering a pyrotechnic component (particularly an airbag module or a belt tensioner) of a (motor) vehicle. The controller can be designed for installation in an on-board network of the vehicle.

The controller is designed to determine and save a trigger status of the pyrotechnic component. The trigger status can be saved, for example, in a storage unit of the controller, for example in the form of a flag. The trigger status can exhibit, for example, a triggered state or a non-triggered state. The controller can be designed to trigger a pyrotechnic component which is connected to the controller, as required (for example in the event of an accident), if the trigger status exhibits the non-triggered state. Secondly, the controller can be (optionally) designed to prevent any triggering of the pyrotechnic component which is connected to the controller, if the trigger status exhibits the triggered state. Thus, optionally, a disablement of triggering can be executed, if the trigger status exhibits the triggered state. Moreover, an indicator element of the vehicle can (preferably) be activated, or maintained in an active state, in order to indicate the triggered state of the trigger status to a user of the vehicle. Any resetting of the indicator element of the vehicle (for example a warning light) can thus be prevented, if the trigger status exhibits the triggered state.

The controller can be designed, if the trigger status exhibits the non-triggered state, to allow operation of the controller with a pyrotechnic component in the vehicle, without enabling the pyrotechnic component. An efficient initial installation of a pyrotechnic component in the vehicle and/or in conjunction with the controller is permitted accordingly. For example, the regulation trigger status can be the non-triggered state. Installation of a pyrotechnic component in a vehicle can thus be permitted during the manufacture of the vehicle, without the execution of an enabling process.

The controller can moreover be designed, if the trigger status exhibits the triggered state (and a triggering of the originally installed pyrotechnic component has thus already been executed), to reset the trigger status from the triggered state to the non-triggered state, if an enablement of the pyrotechnic component is in force. The controller can particularly be designed only to reset the trigger status from the triggered state to the non-triggered state in the event that an enablement of the pyrotechnic component (which is newly installed in the vehicle) is in force. Alternatively or additionally, the controller can be designed to maintain the trigger status in the triggered state, in the event that no enablement of the pyrotechnic component which is (newly) installed in the vehicle is in force.

The controller can further be designed to reset the indicator element of the vehicle for indicating a triggered pyrotechnic component, in particular only in the event that the trigger status has been reset from the triggered state to the non-triggered state. Alternatively or additionally, the controller can be designed to trigger the pyrotechnic component which is (potentially newly) installed in the vehicle, in particular only when required (for example in the event of an accident involving the vehicle), if the trigger status has been reset from the triggered state to the non-triggered state.

The controller can thus be designed to suppress the operation of a newly installed pyrotechnic component in a vehicle, if no successful enablement of the newly installed pyrotechnic component has been executed. It can thus be prevented that a (potentially stolen) pyrotechnic component can be installed in the vehicle.

In an efficient and reliable manner, the controller thus prevents the illicit installation of a pyrotechnic component, for example an airbag, particularly in the interests of eliminating the associated acquisitive crime.

The pyrotechnic component can comprise an identification means, which is designed to clearly identify the pyrotechnic component from a plurality of different pyrotechnic components (and from the corresponding plurality of identification means). The plurality of identification means of the plurality of different pyrotechnic components, which are permitted or enabled as replacement parts, can be saved on a backend server.

In an efficient manner, the identification means can comprise a machine-readable code, particularly a barcode or QR code, including a serial number of the pyrotechnic component. Alternatively or additionally, the identification means can comprise a human-readable serial number of the pyrotechnic component.

The enablement of the pyrotechnic component which is (newly) installed in the vehicle can then be executed in a reliable and efficient manner on the basis of the identification means of the pyrotechnic component (for example by a comparison of the identification means with the plurality of identification means of the plurality of different pyrotechnic components, which are permitted or enabled as replacement parts). In particular, the controller can be designed either to enable or not enable the pyrotechnic component which is (newly) installed in the vehicle on the basis of the identification means of the pyrotechnic component. An efficient and reliable enablement of a pyrotechnic component which is (newly) installed in the vehicle can thus be executed.

The controller can be designed, in the event that the trigger status exhibits the triggered state, to detect that a new pyrotechnic component has been installed in the vehicle. This can be detected, for example, on the basis of an electrical resistance of the pyrotechnic component. For example, a previously triggered pyrotechnic component and a (new) pyrotechnic component which has yet to be triggered can exhibit different resistance values. The controller can be designed to detect the resistance value of the pyrotechnic component which is connected to the controller.

The controller can moreover be designed to detect that the new pyrotechnic component fulfils one or more technical conditions, particularly with respect to electrical resistance, by means of which (in principle and/or on a purely technical basis) it is permitted for the trigger status to be reset from the triggered state to the non-triggered state. In particular, it can be detected that the pyrotechnic component fulfils one or more conditions which permit the pyrotechnic component to be operated, i.e. to be triggered, if required.

However, even in the event that the newly installed pyrotechnic component fulfils the one or more technical conditions for operation in the vehicle, a check can firstly be executed by the controller as to whether or not an enablement is in force. The trigger status can then, and particularly only then, be reset from the triggered state to the non-triggered state, if an enablement of the new pyrotechnic component is in force. Any illicit installation of a new pyrotechnic component in a vehicle can thus be prevented in a particularly reliable manner. The controller can be designed to execute a check as to whether a valid enabling code for the enablement of the pyrotechnic component has been entered via a user interface and/or via a servicing interface of the vehicle. It is possible for the enabling code to have been determined and entered, for example, by a servicing engineer in a workshop, on the basis of the identification means of the (newly installed) pyrotechnic component. The trigger status can then, and particularly only then, be reset from the triggered state to the non-triggered state, if a valid enabling code has been entered. Any illicit installation of a new pyrotechnic component in a vehicle can thus be prevented in a particularly efficient manner.

The controller can be designed to identify and save a plurality of different trigger statuses for a plurality of different pyrotechnic components in a vehicle, and to execute a reset, in the event that an enablement for a respective newly installed pyrotechnic component is in force. In other words, the controller can be designed to operate a plurality of different pyrotechnic components (for different functions, for example for different airbag modules or different belt tensioners), and to execute the monitoring thereof for any illicit replacement. The different pyrotechnic components can be connected at different interfaces of the controller.

As described above, the regulation trigger status at the time of manufacture of the vehicle can assume the non-triggered state such that, during the manufacture of the vehicle, a pyrotechnic component can be installed in the vehicle without enabling the pyrotechnic component, which can then (during the operation of the vehicle) be triggered by the controller, as required. In addition, efficient manufacture of a vehicle can thus be permitted (with no dedicated enabling process).

According to a further aspect, a (road) motor vehicle is described (particularly a passenger motor car, a heavy goods vehicle, a bus or a motorcycle) which comprises the controller described in the present document.

According to a further aspect, a method is described for protection against the unauthorized installation of a pyrotechnic component in a vehicle. The method comprises the determination and saving of a trigger status of the pyrotechnic component, wherein the trigger status can exhibit a triggered state or a non-triggered state. The method, in the event that the trigger status exhibits the non-triggered state, further comprises a facility for the operation of the controller with a pyrotechnic component in the vehicle, without enabling the pyrotechnic component. The method, in the event that the trigger status exhibits the triggered state, further comprises the resetting of the trigger status from the triggered state to the non-triggered state, if an enablement of the pyrotechnic component is in force.

For the enablement of a newly installed pyrotechnic component in the vehicle, the method can comprise the execution of a check, particularly on the backend server of a manufacturer of the vehicle, of the identification means of the newly installed pyrotechnic component, in order to establish whether the newly installed pyrotechnic component has been enabled as a replacement part. The method can further comprise feedback of enablement or non-enablement to the controller of the vehicle for the triggering of the newly installed pyrotechnic component. Generation and checking of the identification means can be executed in a blockchain. Any illicit installation of a pyrotechnic component in a vehicle can thus be prevented in a particularly efficient and reliable manner.

According to a further aspect, a software (SW) program is described. The SW program can be designed to run on a processor (for example on a controller of the vehicle), in order to execute the method described in the present document.

According to a further aspect, a storage medium is described. The storage medium can comprise a SW program which is designed to run on a processor, in order to execute the method described in the present document.

It should be observed that the methods, devices and systems described in the present document can be employed either individually, or in combination with other methods, devices and systems described in the present document. Moreover, any aspects of the methods, devices and systems described in the present document can be mutually combined in a variety of ways. In particular, the features of the claims can be mutually combined in a variety of ways.

The invention is described in greater detail hereinafter with reference to exemplary embodiments.

DETAILED DESCRIPTION OF THE DRAWINGS

Figure 1A:
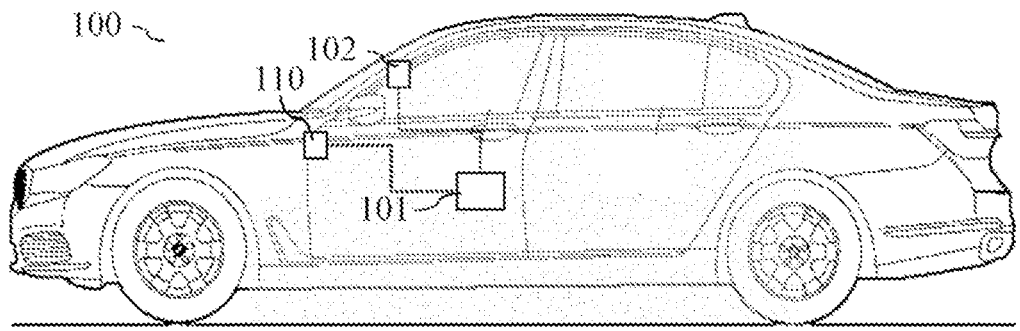
FIG. 1a shows an exemplary vehicle having a pyrotechnic component.

As described above, the present document addresses the provision of efficient and reliable protection against the unauthorized installation of a pyrotechnic component such as, for example, an airbag module. In this connection, FIG. 1a shows a vehicle 100 having a pyrotechnic component 110. The pyrotechnic component 110 can be triggered by a controller 101 of the vehicle 100, for example, in the event of the detection of a collision of the vehicle 100.

Figure 1B:
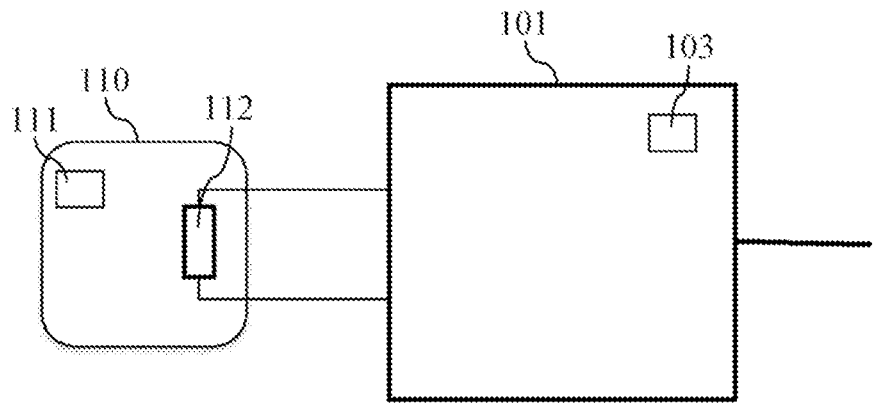
FIG. 1b shows an exemplary pyrotechnic component.

FIG. 1b shows further details of the pyrotechnic component 110 and the controller 101. The controller 101 can be designed, for the triggering of the pyrotechnic component 110, to trigger an ignition unit 112 of the pyrotechnic component 110, for example, by the application of an ignition voltage to the ignition unit 112. The pyrotechnic component 110 is triggered in consequence, in order to deliver a specific function (for example the inflation of an airbag). Further to triggering, typically, the pyrotechnic component 110 can no longer be employed, and must be replaced.

The controller 101 can be designed to save the trigger status 103 of the pyrotechnic component 110 (for example in a status bit). The trigger status 103 can indicate whether or not the pyrotechnic component 110 which is installed in the vehicle 100 has already been triggered. If the trigger status 103 indicates that the pyrotechnic component 110 has already been triggered, any further triggering of the pyrotechnic component 110 can thus be suppressed. In other words, any triggering of the pyrotechnic component 110 by the controller 101, optionally, can then only be possible if the trigger status 103 indicates that the pyrotechnic component 110 has not yet been triggered (for example if the trigger status 103 exhibits the non-triggered state).

The controller 101 can further be designed to initiate the indication by an indicator unit 102 of the vehicle 100, for example on the dashboard of the vehicle 100, to the effect that the pyrotechnic component 110 has already been triggered (if the trigger status 103 indicates a pyrotechnic component 110 which has previously been triggered, or if the trigger status 103 exhibits the triggered state).

The controller 101 can be configured such that the resetting of the trigger status 103, optionally, can only be executed by authorized servicing personnel.

In the context of the manufacture of a vehicle 100, the trigger status 103, in a regulation manner, can indicate the non-triggered state of the pyrotechnic component 110. This permits an arbitrary pyrotechnic component 110 to be installed in the vehicle 100 from a stock of pyrotechnic components 110.

The controller 101 can additionally be configured to execute a check as to whether a newly installed pyrotechnic component 110 is authorized for installation, in the event that the trigger status 103 indicates a triggered state of the pyrotechnic component 110. In other words, the installation and/or subsequent operation of a pyrotechnic component 110, optionally, can only be permitted further to the successful authorization of the newly installed pyrotechnic component 110, if the trigger status 103 exhibits a triggered state. It can thus be prevented, in an efficient and reliable manner, that a stolen pyrotechnic component 110 can be installed in another vehicle 100.

The pyrotechnic component 110, for example, on a housing, can comprise an identification means 111. The identification means 111 can be configured to clearly identify the pyrotechnic component 110. A particularly efficient identification means 111 is a serial number which is applied to the pyrotechnic component 110, for example, by stamping thereupon.

In the context of the installation of the pyrotechnic component 110, it can be necessary for a servicing engineer to enter the serial number of the pyrotechnic component 110 into a servicing computer, and/or into a user interface and/or servicing interface of the vehicle 100. A check can then be executed (for example by a comparison with a backend server of the manufacturer of the pyrotechnic component 110 and/or of the vehicle 100) as to whether the pyrotechnic component 110 is authorized as a replacement part for installation in a vehicle 100.

Further to the successful authorization of the installed pyrotechnic component, a reset of the trigger status 103 can then be executed (to the non-triggered state). In consequence, the indicator element 102 can also be reset (such that it is no longer indicated that it is necessary for the pyrotechnic component 110 to be replaced). The controller 101 can further be enabled for the triggering of the newly installed pyrotechnic component 110 (for example in the event of an accident).

A method is thus described by means of which, in an efficient and reliable manner, any unauthorized installation of a pyrotechnic component 110 can be prevented. The method is based upon the circumstance whereby the controller 101 for a pyrotechnic component 110 is typically permanently integrated in the on-board network of a vehicle 100, and cannot be replaced without complex authentication measures. Any illicit manipulation of the trigger status 103 can thus be reliably prevented. During the manufacture of a vehicle 100, an association is defined between one or more electrical ignition circuit outputs of the controller 101 and one or more pyrotechnic components 110 (for example a driver airbag, side airbag, driver's seatbelt tensioner, etc.). In case of a triggering process, in the event of an accident, the one or more ignition circuit outputs (and thus the corresponding one or more pyrotechnic components 110) are actuated in a specific sequence, and the triggering thereof is executed. All sequences can be permanently saved in the controller 101, in an event data recorder (EDR).

Actuation of an ignition circuit (for a specific pyrotechnic component 110) inevitably results in the destruction of the corresponding actuator (for example of the pyrotechnic component 110). Loss of an actuator 110 further to the corresponding actuation or triggering thereof is detected by the controller 101 and is saved in an internal error memory (for example in the form of a trigger status 103). Indication of the loss of one or more actuators 110 is typically delivered to the user of the vehicle 100 in a continuous manner (for example by means of a warning light 102).

Further to the replacement of an actuator (i.e. of a pyrotechnic component 110), the controller 101 can execute a check as to whether the electrical ignition circuit has undergone repair, for example, whether the ignition circuit again exhibits a stipulated electrical resistance. If this is the case, optionally, the internal error status, particularly the trigger status 103, can be reset. However, resetting of the trigger status 103 can be suppressed, if no enablement of the installed pyrotechnic component 110 has been executed beforehand by a monitoring entity (for example by the manufacturer of the component 110 and/or by the vehicle manufacturer).

Optionally, clearance of the saved error, i.e. the resetting of the trigger status 103, in the controller 101 can only then be executed if the newly installed actuator 110 has been enabled by an authorized entity. If no enablement of the actuator has been executed, it will not be possible for the error memory entry to be reset. In consequence, the error message will be maintained, even after the installation of a new actuator 110.

The enabling process can be executed as follows: each actuator 110 has an individual serial number 111, which can be applied to the respective component 110 in a visible manner. The serial number 111 can be applied, for example, in the form of a barcode, a QR code and/or in a legible form.

In conjunction with production, the manufacturer of actuators 110 can refer the serial numbers 111 of individual actuators 110 to the manufacturer of the vehicle 100. The transmission and storage of serial numbers 111 can be executed by the application of IT protective measures. The servicing engineer who undertakes the repair of a triggered actuator 110 can input or scan the serial number 111 of the actuator 110, which can then be electronically transmitted to the manufacturer of the vehicle 100 (for example on a backend server). This can be executed via a communication link between a computer in the workshop and a server of the manufacturer. Information with respect to the repair process (for example the saved error code and the serial number 111 of the replacement part 110) can also be transmitted.

The server of the manufacturer can compare the serial number 111 with saved serial numbers of actuators 110 which are approved as the replacement part. In the event of correct allocation, the enablement of error clearance can be notified. Otherwise, enablement can be suppressed.

The entire sequence, from the generation of serial numbers 111, the referral of a query to the manufacturer of the vehicle 100 and the enablement of error clearance, can be executed in a blockchain. Any manipulations can thus be excluded in a reliable manner. The blockchain can also be employed such that data are recorded during the manufacturing process of the vehicle 100. This can be undertaken by the manufacturer of the actuator 110. Any additional data logging operations in the manufacturing process of the vehicle 100 can be omitted accordingly.

The process described can be scalable. Optionally, the process described can be employed for only one or more endangered components 110 of a vehicle 100. Non-critical components can optionally be excluded from monitoring (and thus from the associated enabling process) by means of a corresponding configuration in the controller 101.

The pyrotechnic component 110 described in the present document can be implemented in an efficient manner, with no additional safety measures (nowadays, an identification means 111, particularly a serial number, is typically already present). Theft protection is only activated upon the exchange or replacement of a (previously triggered or defective) pyrotechnic component 110. Saved information, particularly the trigger status 103, on the controller 101 is employed for the execution of theft protection.

As described above, upon the triggering of a pyrotechnic component 110, the triggering process is saved in the controller 101 in the form of the trigger status 103. At the same time, a corresponding indicator 102 is typically activated in the vehicle 100 in a continuous manner. The indicator 102 notifies the user that the safety system of the vehicle 100 is impaired or is not fully functional.

Resetting of the saved trigger status, and of the associated indicator 102, can only be executed in response to evidence that an authorized replacement part has been installed.

By means of the process described, additional complexity can be eliminated from vehicle production, on the grounds that no triggering has yet been saved in the controller 101 (the trigger status 103 assumes the non-triggered state). In this case, each pyrotechnic component 110 will be accepted by the controller 101 (with no enabling process).

Additionally, the controller 101, in the event of a repair (further to a saved triggering) can only be restored to an error-free state once the origin of the replacement part 110 has been confirmed (in the context of an enabling process).

Figure 2:
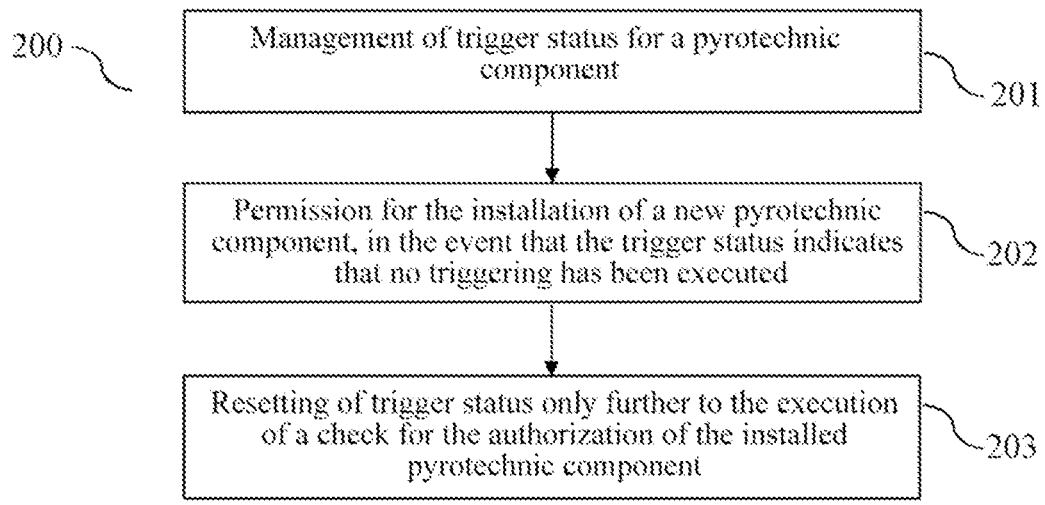
FIG. 2 is a flow diagram of an exemplary method for protection against the unauthorized installation of a pyrotechnic component.

FIG. 2 shows a flow diagram of an exemplary (optionally, computer-implemented) method 200 for protection against the unauthorized installation of a pyrotechnic component 110 in a vehicle 100. The method 200 can be (at least partially) implemented by a controller 101 of the vehicle 100. The method 200 comprises the determination and saving 201, particularly the management, of a trigger status 103 of the pyrotechnic component 110. The trigger status 103 can exhibit a triggered state (if the pyrotechnic component 110 which was previously installed in the vehicle 100 has been triggered, and can thus no longer be triggered) or a non-triggered state (if the triggering of a pyrotechnic component 110 is still possible). The trigger status 103 can thus be expressed as a binary variable for the triggered state (for example "1") or for the non-triggered state (for example "0").

The method 200 further comprises, if the trigger status 103 exhibits the non-triggered state, a facility 202 for the operation of the controller 101 with a pyrotechnic component 110 in the vehicle 100, with no (preliminary) enablement of the pyrotechnic component 110. The regulation trigger status 103 can assume the non-triggered state. During the manufacture of the vehicle 100, this permits a pyrotechnic component 110 to be installed in the vehicle 100, and employed thereafter, without the execution of an enablement procedure. An efficient manufacturing process of a vehicle 100 can thus be permitted.

The method 200 further comprises, if the trigger status 103 exhibits the triggered state, the resetting 203 of the trigger status 103 from the triggered state to the non-triggered state, provided that (and, optionally, only if) an enablement of the pyrotechnic component 110 is in force. If the trigger status 103 exhibits the triggered state, the execution of an enabling process for a newly installed pyrotechnic component 110 can thus be required, in order to permit the subsequent operation of the pyrotechnic component 110 in the vehicle 100. Any unauthorized installation of a pyrotechnic component 110, and the associated acquisitive crime, can thus be prevented in a reliable manner.

By means of the measures described in the present document, the employment of non-triggered and potentially stolen pyrotechnic component 110 can be prevented in an efficient and reliable manner.

It can occur, moreover, that a counterfeit pyrotechnic component 110 is installed in a vehicle 100. A counterfeit pyrotechnic component 110 can potentially be configured to fulfil the one or more technical conditions, particularly with respect to electrical resistance, which are required for the resetting of the trigger status 103 from the triggered state to the non-triggered state. Additionally, however, it can occur that the counterfeit pyrotechnic component 110 is not functional (for example on the grounds that the pyrotechnic component 110 has no propellant). By means of the measures described in the present document, the installation of a counterfeit pyrotechnic component 110 can be reliably detected and potentially prevented.

Moreover, for example, on the Internet, pyrotechnic components 110 can frequently be offered for sale from accident-damaged vehicles or from vehicles which have sustained water damage. The exact origin and/or functional condition of these pyrotechnic components 110 are generally not known. In particular, typically, it cannot be guaranteed that a pyrotechnic component 110 from a vehicle which has sustained water damage (for example as a result of flooding) will still be functionally capable, after drying. By means of the measures described in the present document, the installation of a used pyrotechnic component 110 can be reliably detected, and potentially prevented.

The present invention is not limited to the exemplary embodiments illustrated. In particular, it should be observed that the description and the figures are only intended to illustrate the principle of the proposed methods, devices and systems in an exemplary manner.

The invention claimed is:

1. An apparatus for triggering a pyrotechnic component of a vehicle, comprising:
   a controller operatively configured to:
   determine and save a trigger status of the pyrotechnic component, wherein the trigger status exhibits a triggered state or a non-triggered state;
   in an event that the trigger status exhibits the non-triggered state, permit operation of the controller with a pyrotechnic component in the vehicle, without enabling the pyrotechnic component; and
   in an event that the trigger status exhibits the triggered state, reset the trigger status from the triggered state to the non-triggered state, when an enablement of the pyrotechnic component is in force, wherein the trigger status is associated with whether or not the pyrotechnic component has been deployed, and the enablement of pyrotechnic component makes the pyrotechnic component functional.

2. The apparatus according to claim 1, wherein the controller is further operatively configured to:
   only reset the trigger status from the triggered state to the non-triggered state in an event that an enablement of the pyrotechnic component is in force; and/or
   maintain the trigger status in the triggered state in an event that no enablement of the pyrotechnic component which is installed in the vehicle is in force.

3. The apparatus according to claim 1, wherein:
   the pyrotechnic component comprises an identification means, which is designed to identify the pyrotechnic component from a plurality of different pyrotechnic components; and
   enablement of the pyrotechnic component which is installed in the vehicle is executed on the basis of the identification means of the pyrotechnic component; and
   the controller is further operatively configured either to enable or not enable the pyrotechnic component which is installed in the vehicle on the basis of the identification means of the pyrotechnic component.

4. The apparatus according to claim 3, wherein the identification means comprises:
   a machine-readable code; and/or
   a human-readable serial number of the pyrotechnic component.

5. The apparatus according to claim 4, wherein the machine-readable code is a barcode or a QR code, including a serial number of the pyrotechnic component.

6. The apparatus according to claim 1, wherein the controller is further operatively configured to, in the event that the trigger status exhibits the triggered state:
   detect that a new pyrotechnic component has been installed in the vehicle;
   detect that the new pyrotechnic component fulfils one or more technical conditions, with respect to electrical resistance, by which it is permitted for the trigger status to be reset from the triggered state to the non-triggered state;
   execute a check as to whether an enablement of the new pyrotechnic component is in force; and
   reset the trigger status from the triggered state to the non-triggered state, only in the event than an enablement of the new pyrotechnic component is in force.

7. The apparatus according to claim 1, wherein the controller is further operatively configured to:
   execute a check as to whether a valid enabling code for the enablement of the pyrotechnic component has been entered via a user interface and/or via a servicing interface of the vehicle; and
   reset the trigger status from the triggered state to the non-triggered state only in the event that a valid enabling code has been entered.

8. The apparatus according to claim 1, wherein the controller is further operatively configured to:
   reset the indicator element for indicating a triggered pyrotechnic component only in the event that the trigger status has been reset from the triggered state to the non-triggered state; and/or
   trigger the pyrotechnic component which is installed in the vehicle, as required, only in the event that the trigger status has been reset from the triggered state to the non-triggered state.

9. The apparatus according to claim 1, wherein the controller is further operatively configured to identify and save a plurality of different trigger statuses for a plurality of different pyrotechnic components in a vehicle, and to execute a reset, in the event that an enablement for a respective newly installed pyrotechnic component is in force.

10. The apparatus according to claim 1, wherein
    the regulation trigger status at the time of manufacture of the vehicle assumes the non-triggered state such that, during the manufacture of the vehicle, a pyrotechnic component can be installed in the vehicle without enabling the pyrotechnic component, which can then be triggered by the controller, as required.

11. A method for protection against unauthorized installation of a pyrotechnic component in a vehicle, the method comprising:
    determining and saving a trigger status of the pyrotechnic component, wherein the trigger status exhibits a triggered state or a non-triggered state;
    in an event that the trigger status exhibits the non-triggered state, permitting the operation of the controller with a pyrotechnic component in the vehicle, without enabling the pyrotechnic component; and
    in an event that the trigger status exhibits the triggered state, resetting the trigger status from the triggered state to the non-triggered state, when an enablement of the pyrotechnic component is in force, wherein the trigger status is associated with whether or not the pyrotechnic component has been deployed, and the enablement of pyrotechnic component makes the pyrotechnic component functional.

12. The method according to claim 11, wherein for the enablement of a newly installed pyrotechnic component in the vehicle, the method further comprising:

executing a check on a backend server of a manufacturer of the vehicle, of an identification means of the newly installed pyrotechnic component, in order to establish whether the newly installed pyrotechnic component has been enabled as a replacement part; and feeding back the enablement or non-enablement to a controller of the vehicle for triggering the newly installed pyrotechnic component.

13. The method according to claim 12, wherein the executing of the check of the identification means is carried out in a blockchain.

* * * * *